(12) United States Patent
Shokrollahi et al.

(10) Patent No.: US 10,461,938 B2
(45) Date of Patent: Oct. 29, 2019

(54) METHOD FOR MANIPULATION PROTECTION

(71) Applicant: Robert Bosch Gmbh, Stuttgart (DE)

(72) Inventors: Jamshid Shokrollahi, Ludwigsburg (DE); Jan Zibuschka, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 15/046,137

(22) Filed: Feb. 17, 2016

(65) Prior Publication Data

US 2016/0241404 A1    Aug. 18, 2016

(30) Foreign Application Priority Data

Feb. 18, 2015 (DE) .................. 10 2015 202 935

(51) Int. Cl.
| | | |
|---|---|---|
| *H04L 9/32* | (2006.01) | |
| *G06F 21/64* | (2013.01) | |
| *H04L 29/06* | (2006.01) | |
| *H04L 9/08* | (2006.01) | |

(52) U.S. Cl.
CPC ............ *H04L 9/3247* (2013.01); *G06F 21/64* (2013.01); *H04L 9/0897* (2013.01); *H04L 9/3242* (2013.01); *H04L 63/0428* (2013.01); *H04L 63/0442* (2013.01); *H04L 63/08* (2013.01); *H04L 63/12* (2013.01)

(58) Field of Classification Search
CPC ..... H04L 9/3297; H04L 9/002; H04L 9/0643; H04L 9/0825; H04L 9/3242; H04L 9/3271; H04L 2209/20; H04L 2209/805; H04L 9/0897; H04L 9/3247; H04L 63/0428; H04L 63/08; H04L 63/12; H04L 63/0442; G06F 21/64
See application file for complete search history.

(56) References Cited

U.S. PATENT DOCUMENTS

| | | | | |
|---|---|---|---|---|
| 8,316,235 | B2* | 11/2012 | Boehl | .............. H04L 9/0637 380/46 |
| 8,639,925 | B2* | 1/2014 | Schuetze | ............. H04L 9/002 713/168 |
| 9,100,193 | B2* | 8/2015 | Newsome | ............. H04L 9/12 |
| 9,843,447 | B1* | 12/2017 | Bishop | ............. H04L 63/1466 |
| 2010/0268949 | A1* | 10/2010 | Schuetze | ............. H04L 9/002 713/168 |

(Continued)

FOREIGN PATENT DOCUMENTS

DE        102009002396        10/2010

*Primary Examiner* — Tamara T Kyle
(74) *Attorney, Agent, or Firm* — Norton Rose Fulbright US LLP; Gerard Messina

(57) ABSTRACT

A method and a device for manipulation protection, including receiving a first data packet sent from a first device by a second device, the first data packet including a first time-variant parameter; signing a concatenation of a first hash value with the first time-variant parameter and an identification of the second device with the aid of a private key of an asymmetric encryption method which is assigned to the second device, program instructions or data, which are stored on the second device and provided to be carried out during the operation of the second device, being used to determine the hash value; generating a second data packet including the signature and the concatenation; and sending the second data packet from the second device to the first device.

11 Claims, 2 Drawing Sheets

(56) References Cited

U.S. PATENT DOCUMENTS

2014/0301550 A1* 10/2014 Lewis .................. H04L 9/0825
380/259
2016/0196852 A1* 7/2016 Sievert ................ G11B 27/102
386/241
2017/0206532 A1* 7/2017 Choi ....................... H04L 67/02

* cited by examiner

METHOD FOR MANIPULATION PROTECTION

CROSS REFERENCE

The present application claims the benefit under 35 U.S.C. § 119 of German Patent Application No. 102015202935.2 filed on Feb. 18, 2015, which is expressly incorporated herein by reference in its entirety.

BACKGROUND INFORMATION

A method for protecting a sensor and sensor data of the sensor from manipulation is described in German Patent Application No. DE 10 2009 002 396 A1, in which a random number is transmitted from a control unit to the sensor within the scope of an authentication of the sensor. The sensor data are provided with a cryptographic integrity protection on the one hand, and additional time-variant parameters are added to the sensor data on the other hand. The sensor data are transmitted together with the integrity protection and the added time-variant parameters from the sensor to the control unit. The random number, or a portion of the random number, or a number obtained from the random number with the aid of a function, is used for the time-variant parameters during the authentication of the sensor.

In this way, both the identity of the sensor and the integrity of the data transmitted by the sensor are protected.

SUMMARY

In addition to protecting the identity of a sensor and the integrity of the data transmitted from the sensor, a protection of the integrity of the software or firmware used on the sensor is desirable.

An example method according to the present invention, the example device according to the present invention, and the example computer program according to the present invention may make it possible to protect the integrity of the firmware or software present on a device and to confirm the same on another device.

In this way, integrity protection as a function of the integrity of the firmware or software running on a protected device is made possible. It is thus possible in the case of a sensor to protect the integrity of the firmware or software controlling the sensor or the measurements of the sensor, for example.

The use of asymmetric cryptography facilitates the handling of the protection for a plurality of different devices to be protected or of a plurality of different device manufacturers.

The first data packet preferably includes a concatenation of an identification of the first device with the first time-variant parameter, and a message authentication code is generated and transmitted as a function of the concatenation. This makes additional integrity protection of the transmitted data possible.

Preferably, it is provided that the private key is stored in a trustworthy area, in particular in a physically unclonable function (PUF) or a Trusted Platform Module (TPM). This additionally increases the security, in particular when the hardware used is designed in such a way that, except for the data access provided by the manufacturer, no other non-destructive access to the trustworthy area is possible.

The time-variant parameter is preferably a random number, a portion of a random number, or a number which was calculated from the application of a function to the random number. The use of random numbers additionally increases the resistance to replay attacks.

The second data packet is preferably divided into portions having a certain (bit) length, and at least a portion of the second data packet is transmitted concatenated with other information to be sent from the second device to the first device. In this way, the signal transmission is particularly efficient. This applies in particular when preferably the lowest-value bits of the other information to be sent are replaced with the linkage with one or multiple portions of the second data packet.

Preferably, an error correction code is provided as an additional value, which is transmitted and evaluated at the receiver, for the transmission of the second data packet, and a correction with the aid of the error correction code is provided when a manipulation is identified. In this way, the reliability of the transmission is increased.

When a manipulation is identified, preferably a repeated transmission of the affected second data packet or a shut-off of the first device, of the second device or of a system to which at least one of the devices belongs, is provided. In this way, either the robustness with respect to transmission errors is increased, or a particularly secure system is implemented.

BRIEF DESCRIPTION OF THE DRAWINGS

Exemplary embodiments of the present invention are shown in the figures and are described in greater detail below.

DETAILED DESCRIPTION OF EXAMPLE EMBODIMENTS

Figure 1:
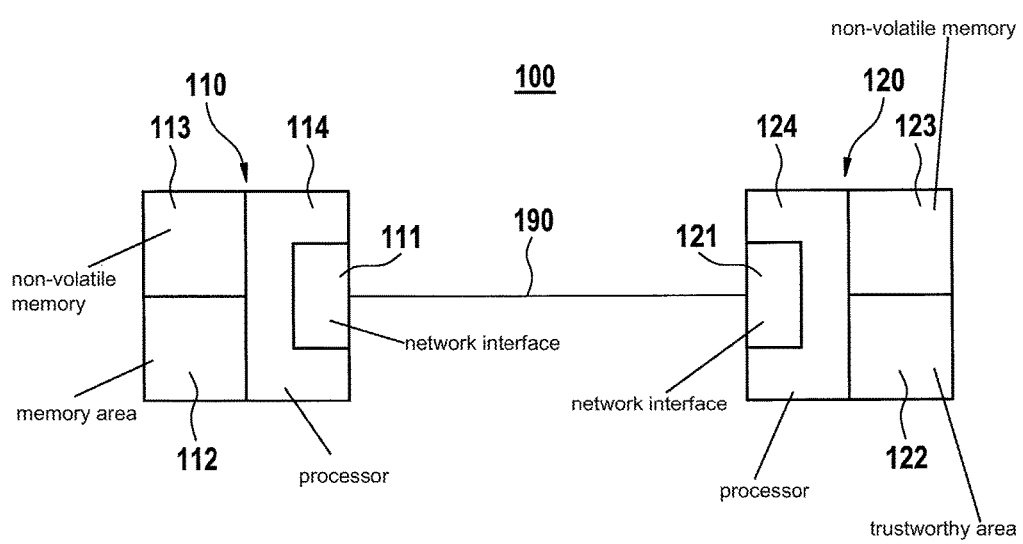
FIG. 1 shows a schematic representation of a portion of a system for manipulation protection.

FIG. 1 schematically shows a representation of a portion of a system 100 for manipulation protection, including a first device 110 and a second device 120.

First device 110 includes a first network interface 111. Second device 120 includes a second network interface 121. First network interface 111 and second network interface 121 are designed in such a way that they are connectable to each other for data exchange via a data connection 190. A digital PSI5 interface is preferably provided for the data exchange. It is also possible to provide a field bus, such as a controller area network, for example. Other fixed-line data connections or wireless data connections, such as WLAN, and arbitrary protocols for network communication, such as the Internet Protocol/Transmission Control Protocol, may also be provided. Network interfaces 111 and 121 are accordingly adapted in this case.

First device 110 includes a memory area 112, for example an electrically erasable programmable read-only memory (EEPROM), on which in the example a public key PKCA of a first key pair PKCA, SKCA, made up of public key PKCA and secret key SKCA, of an asymmetric encryption or signature method is stored.

Second device 120 includes a trustworthy area 122, for example a physically unclonable function (PUF) or a Trusted Platform Module (TPM), in which a secret key PKS, assigned to second device 120, of a key pair PKS, SKS, made up of a public key PKS assigned to the second device and secret key SKS, of the same asymmetric encryption method is stored.

For example, an RSA is used as the asymmetric encryption or signature method, or an Elliptic Curve Digital Signature Algorithm (ECDSA) method is used as the signature method.

First device 110 furthermore includes a non-volatile memory 113, for example a flash EEPROM, on which program instructions intended to be carried out during the operation of first device 110 or data, for example firmware or software, are stored.

First device 110 furthermore includes a processor 114, which is connected to second network interface 111, memory area 112 and non-volatile memory 113 for communication, for example via a data bus, which is not shown.

Processor 114 is designed to carry out the instructions for the operation of first device 110 during the start of system 100 and, for this purpose, to communicate with second device 120 with the aid of first network interface 111.

Processor 114 is furthermore designed to carry out the method for manipulation protection described hereafter.

Second device 120 includes a non-volatile memory 123, for example a flash EEPROM, on which program instructions intended to be carried out during the operation of second device 120 or data, for example firmware or software, are stored.

Second device 120 furthermore includes a processor 124, which is connected to second network interface 121, trustworthy area 122 and non-volatile memory 123 for communication, for example via a data bus, which is not shown.

Processor 124 is designed to carry out the instructions for the operation of second device 120 during the start of system 100 and, for this purpose, to communicate with second device 110 with the aid of second network interface 121.

Processor 124 is furthermore designed to carry out the method for manipulation protection described hereafter.

The example described hereafter protects the integrity of the instructions and data for the operation of second device 120 against manipulation. The method is described based on the example of firmware FWS'; however, it may also be applied to other instructions and data. In the following example, first device 110 is a control unit E, and second device 120 is a sensor S. However, the method may also be applied to other devices.

Prior to the start of the method, a certification authority CA, or a certificate authority, generates a first signature SigCA(h'(FWS')) with the aid of its first key pair PKCA, SKCA from a hash value h'(FWS') of firmware FWS'. For example, the hash value is generated using an MD5 or an SHA-1 hash function. Moreover, a second signature SigCA (PKS) of the public key of second key pair PKS, SKS is generated.

For example, certification authority CA generates, as an associated signature SigCA( . . . ), either an integrated signature SigCA(h'(FWS')|PKS) or two signatures SigCA (h'(FWS'),r), SigCA(PKS,r) having a shared but random value r.

For this purpose, the manufacturer of sensor S generates hash value h'(FWS') and transmits the same to certification authority CA together with its public key PKS and firmware FW.

Certification authority CA sends associated signature SigCA( . . . ) to the manufacturer of control unit E.

Upon receipt of associated signature SigCA( . . . ), manufacturer E also procures the public keys of all desired trustworthy certification authorities, in particular public key PKCA of certification authority CA, which is stored in memory area 112 as described above.

Moreover, an identification of the respective device is stored in one of the aforementioned memories in sensor S and in control unit E. For example, a respective serial number or portions thereof serve as identification. It is also possible to use any other identification, for example an alphanumeric string.

The method begins, for example, when sensor S and control unit E are connected to each other via the respective network interface and data connection. In the example, sensor S and control unit E are installed in a vehicle and connected to each other for this purpose. The method may be repeated during every vehicle restart, for example, or else at arbitrary predefinable time intervals.

Figure 2:
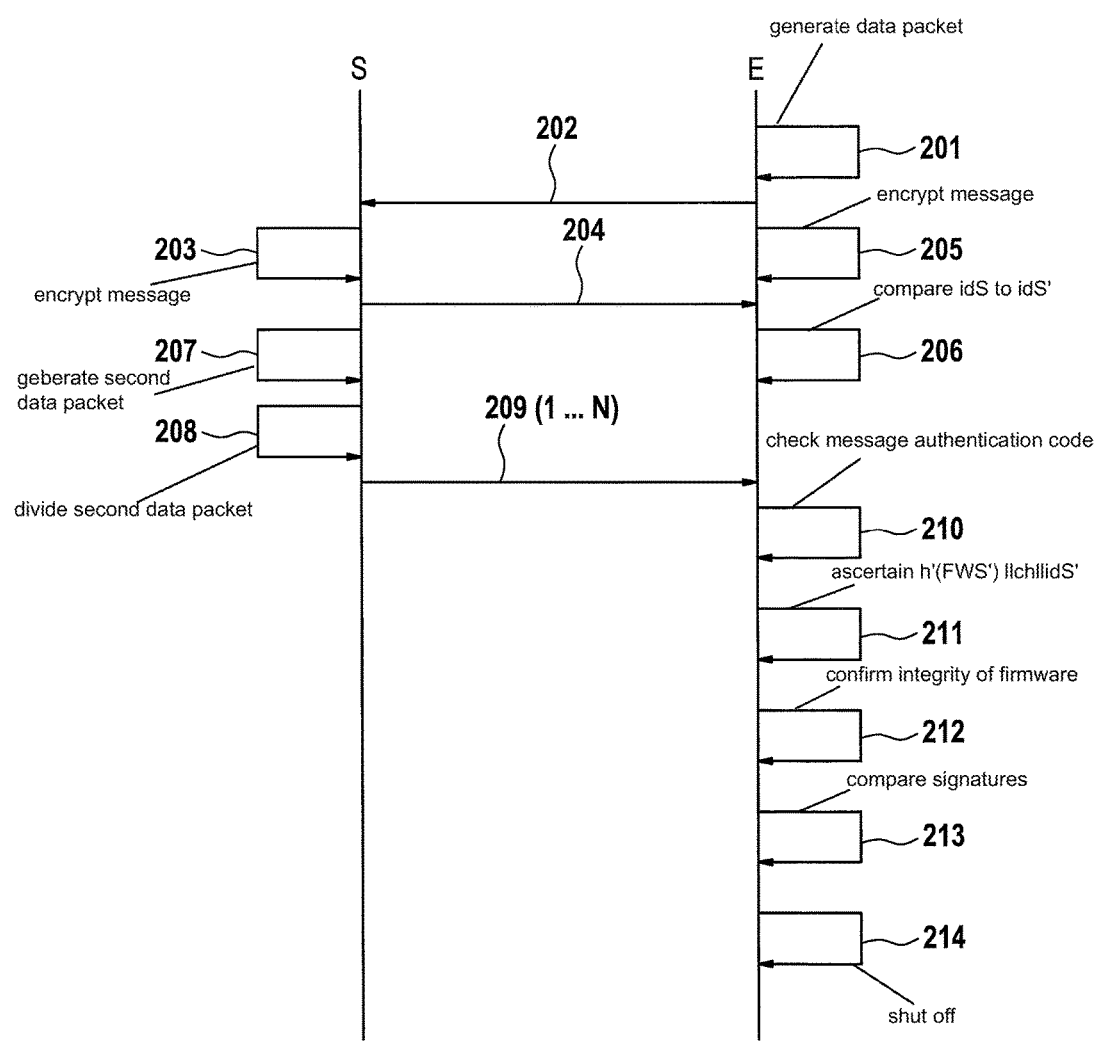
FIG. 2 shows a signal flow chart.

FIG. 2 shows a signal flow, based on which the method is described hereinafter. Sensor S and control unit E are correspondingly identified with S and E in FIG. 2.

After the start, an authentication phase begins, during which a first data packet DK1 is generated in a first step 201. For authentication, a shared symmetric authentication key K, for example of an AES 128 or PRESENT encryption method, is used in the example. In the example, this key is stored in each of the devices in one of the memories. However, the authentication is also possible with other encryption or authentication methods, for example using the stored asymmetric keys. Moreover, a table which is stored in the secure memory and contains challenge-response pairs may be used.

First data packet DK1 is transmitted as a challenge to sensor S. The sensor generates a response therefrom in the trustworthy area. In the example, the response is generated by encryption of first data packet DK1 with the aid of the PUF and cryptographic secret key SKS contained therein. Alternatively, it would also be possible to use a measurement result generated by the TPM in response to first data packet DK1 as the response.

First data packet DK1 includes a first time-variant parameter. For example, the time-variant parameter is a random number ch, a portion of a random number, or a number which was calculated from the application of a function to the random number. It is also possible to use a number which is calculated without knowledge of the calculation algorithm, i.e., which is not distinguishable from a random number for an attacker, for example a pseudo random number.

The method is described hereafter based on the example of random number ch. The random number is generated, for example, as 64-bit random number ch in control unit E.

In the example, first data packet DK1 moreover includes an identification of control unit E, for example serial number idR of control unit E. Serial number idR has a length of 32 bits, for example.

First data packet D1 is generated as a concatenation of random number ch with serial number idR: D1=ch||idR.

First data packet DK1 is transmitted in a message 202 by control unit E and received by sensor S.

Upon receipt of message 202, sensor S in a step 203 encrypts message 202 with the aid of the shared symmetric authentication key K to form an encrypted data packet DK=Enc$_K$(ch||idR).

Thereafter, the sensor sends a message 204 to control unit E. Message 204 includes a concatenation Enc$_K$(ch||idR) ||idS of encrypted message 202 with serial number idS of the sensor, which in the example is serial number idS of sensor S. Serial number idS has a length of 32 bits, for example.

Upon sending message 202, control unit E in a step 205 also encrypts message 202 with the aid of the shared symmetric authentication key K to form a further encrypted data packet DK'=Enc$_K$(ch||idR).

Upon receipt of message 204, control unit E compares serial number idS of sensor S from message 204 in a step 206 to expected serial number idS'. Expected serial number idS' is stored in one of the memories, for example within the scope of the installation in control unit E suited to the subsequently installed sensor S. Moreover, in step 206, encrypted data packet DK is compared to further encrypted data packet DK'.

If serial number idS agrees with expected serial number idS', and encrypted data packet DK agrees with further encrypted data packet DK', sensor S has successfully authenticated itself with respect to control unit E.

In the example, encrypted data packet DK is generated with the aid of the PUF. Instead, it is also possible to use a measurement of the TPM. In this case, a table of challenge-response values is provided instead of further encrypted data packet DK'. Data packet DK in this case includes the response, and by comparing the response, i.e., the measurement result, to an expected response from the table, the authentication is confirmed if agreement exists.

Upon receipt of message 202, a second data packet DK2 is generated by sensor S in a step 207.

For this purpose, sensor S in the trustworthy area generates further hash value h(FWS) of firmware FWS provided for the operation of sensor S. The same hash function, for example MD5 or SHA-1 hash function, is used here as was used also in the above-mentioned calculation of the hash value for certification authority CA.

In this way, the two hash values h(FWS) and h'(FWS') only agree if the same firmware is involved, i.e., FWS=FWS'.

Then, a concatenation of further hash value h(FWS) with random number ch and serial number idS of sensor S is signed with the aid of private key SKS of the asymmetric encryption method which is assigned to sensor S.

In this way, second data packet DK2=sig$_{SKS}$ (h(FWS) ||ch||idS) is generated. Second data packet DK2 thus includes the signature and the linkage.

Second data packet DK2 is preferably divided in a step 208 into N portions, for example N bits having a certain length. These are transmitted together with payload data m.

Thereafter, second data packet DK2 is sent from sensor S to control unit E. The N portions are transmitted in the example to the control unit in N iterations in N messages 209 (1 . . . N).

Alternatively, it is also possible to transmit multiple portions together in fewer than N messages 203. It is also possible to transmit second data packet DK2 in a single message 203.

In the example, a message authentication code (MAC), for example a cipher-based MAC (CMAC), is used. For this purpose, a shared message authentication code key kMAC is stored in both devices, for example in one of the memories.

Sensor S divides second data packet DK2=sig$_{SKS}$ (h(FWS) ||ch||idS) into N equally long portions: (s[0], s[1], . . . , s[N])=sig$_{SKS}$(h(FWS) ||ch||idS).

Thereafter, sensor S generates in N iterations the N messages 209 by using the MAC to a linkage including respective payload data m[i], serial numbers idS of sensor S, serial number idR of control unit E, and the respective portion s[i] for i=1 . . . N:

$$MAC_{kMAC}(m[i]||(ch+i)||idS||idR||s[i]).$$

Control unit E receives messages 209 and, upon receipt of the N messages 209, checks the message authentication code in a step 210.

Subsequently, control unit E ascertains a further concatenation h'(FWS') ||ch||idS' in a step 211. This concatenation corresponds to the integer value of the firmware which was not sent by a sensor other than the expected one and was not generated by a replay attack.

Through the comparison of further concatenation h'(FWS') ||ch||idS' to linkage h(FWS) ||ch||idS received in second data packet DK2, the integrity of the firmware is confirmed by control unit E in a step 212.

In a further comparison, signature sig$_{SKS}$(h(FWS) ||ch||idS) of second data packet DK2 is verified with the aid of associated signature SigCA( . . . ) in a step 213.

With successful verification and integrity check of the firmware, in particular with successful checks in steps 210, 211 and 212, no manipulation was identified. The method is subsequently repeated, if necessary with a certain time delay, or when control unit E or sensor S is switched on again.

Otherwise, control unit E, or a system 100 to which control unit E belongs, is shut off in a step 214 since a manipulation was identified. It may also be provided in this case to send a further message to sensor S which is intended to prompt sensor S to shut off.

For the transmission of messages 209, preferably an error correction code is provided for the transmission of second data packet DK2. In this case, preferably a correction is provided with the aid of the error correction code when a manipulation is identified in step 214.

It is also possible to provide a repeated transmission of the affected second data packet when a manipulation is identified in step 214.

If the above-mentioned data or data packets or intermediate results for the cryptographic operations do not have the appropriate (bit) lengths, moreover an adaptation of the length may be provided, for example with the aid of padding.

What is claimed is:

1. A method for manipulation protection, comprising:
   receiving a first data packet sent from a first device by a second device, the first data packet including a first time-variant parameter;
   determining a first hash value, the first hash value being a hash of program instructions stored in at least one memory device of the second device for operating the second device;
   signing with the aid of a private key, assigned to the second device, of an asymmetric encryption method, a concatenation of: (i) the first hash value, (ii) the first time-variant parameter, and (iii) an identification of the second device;
   generating a second data packet including the signature and the concatenation of: (i) the first hash value, (ii) the first time-variant parameter, and (iii) the identification of the second device; and
   sending the second data packet from the second device to the first device.

2. The method as recited in claim 1, wherein the first data packet includes a concatenation of an identification of the first device with the first time-variant parameter, and a message authentication code is generated and transmitted as a function of the concatenation of the identification of the first device with the first time-variant parameter.

3. A device for carrying out a manipulation protection, comprising:
- a network interface which receives a first data packet sent from a first device by a second device, the first data packet including a first time-variant parameter; and
- a processor which determines a first hash value, signs, with the aid of a private key, assigned to the second device, of an asymmetric encryption method, a concatenation of: (i) the first hash value, (ii) the first time-variant parameter, and (iii) an identification of the second device and generates a second data packet including the signature and the concatenation of: (i) the first hash value, (ii) the first time-variant parameter, and (iii) the identification of the second device;
- wherein the first hash value is a hash of program instructions stored in a memory device of the second device for operating the second device;
- wherein the device is configured to send, via the network interface of the device, the second data packet from the second device to the first device.

4. A non-transitory computer-readable storage device, storing a computer program, the computer program, when executed by a processor, causing the processor to perform:
- receiving a first data packet sent from a first device by a second device, the first data packet including a first time-variant parameter;
- determining a first hash value, the first hash value being a hash of program instructions stored in at least one memory device of the second device for operating the second device;
- signing with the aid of a private key, assigned to the second device, of an asymmetric encryption method, a concatenation of: (i) the first hash value, (ii) the first time-variant parameter, and (iii) an identification of the second device;
- generating a second data packet including the signature and the concatenation of: (i) the first hash value, (ii) the first time-variant parameter, and (iii) the identification of the second device; and
- sending the second data packet from the second device to the first device.

5. The method as recited in claim 1, wherein:
- the signature can be checked by the first device using a public key assigned to the second device; and
- a manipulation is determinable by the first device based on a result of a comparison of a portion of data of the second data packet to a comparison value that is calculable by concatenating the first time-variant parameter, an identification of the second device, and a second hash value determined by program instructions or data provided to be carried out during the operation of the second device.

6. The method as recited in claim 5, wherein, when the manipulation is determined, the second data packet is responsively repeatedly transmitted or the first device, the second device, or a system to which at least one of the first and second devices belongs is shut off.

7. The method as recited in claim 1, wherein the first data packet includes a concatenation of an identification of the first device with the first time-variant parameter, with which concatenation a message authentication code that is sent by the second device can be checked by the first device.

8. The method as recited in claim 1, wherein the private key is stored in a trustworthy memory area that includes a physically unclonable function or a Trusted Platform Module.

9. The method as recited in claim 1, wherein the time-variant parameter is i) a random number, ii) a portion of a random number, iii) a number calculated by application of a function to a random number, or iv) a number not distinguishable from a random number.

10. The method as recited in claim 1, wherein the second data packet is divided into portions having a certain bit length, and at least a portion of the second data packet is transmitted concatenated with other information to be sent from the second device to the first device.

11. The method as recited in claim 1, wherein an error correction code is provided for transmission with the second data packet, and a correction with the aid of the error correction code being performed when a manipulation is identified by the first device based on the second data packet.

* * * * *